United States Patent [19]
Takeuchi

[11] Patent Number: 5,090,543
[45] Date of Patent: Feb. 25, 1992

[54] DAMPER DISC

[75] Inventor: Hiroshi Takeuchi, Nayagawa, Japan

[73] Assignee: Kabushiki Kaisha Daikin Seisakusho, Osaka, Japan

[21] Appl. No.: 582,227

[22] PCT Filed: Feb. 5, 1990

[86] PCT No.: PCT/JP90/00139
§ 371 Date: Oct. 2, 1990
§ 102(e) Date: Oct. 2, 1990

[87] PCT Pub. No.: WO90/09532
PCT Pub. Date: Aug. 23, 1990

[30] Foreign Application Priority Data
Feb. 17, 1989 [JP] Japan .................. 1-18276[U]

[51] Int. Cl.5 ............................................ F16D 3/14
[52] U.S. Cl. ............................. 192/106.2; 464/64; 464/68
[58] Field of Search ............... 192/106.2; 464/64, 68

[56] References Cited
U.S. PATENT DOCUMENTS

| | | | |
|---|---|---|---|
| 2,149,887 | 3/1939 | Hickman | 464/64 X |
| 2,220,566 | 11/1940 | Wood | 464/68 X |
| 4,188,806 | 2/1980 | Fall et al. | 464/68 X |
| 4,376,477 | 3/1983 | Loizeau | 192/106.2 |
| 4,427,400 | 1/1984 | Lamarche | 464/68 X |
| 4,467,905 | 8/1984 | Takeuchi | 192/106.2 |
| 4,530,673 | 7/1985 | Lamarache | 192/106.2 X |
| 4,601,676 | 7/1986 | Tojima et al. | 464/68 X |
| 4,743,217 | 5/1988 | Tojima et al. | 192/106.2 X |

FOREIGN PATENT DOCUMENTS

| | | | |
|---|---|---|---|
| 61-290235 | 6/1985 | Japan | 192/106.2 |
| 1-141931 | 9/1989 | Japan . | |
| 2-5633 | 1/1990 | Japan . | |

Primary Examiner—Leslie A. Braun
Assistant Examiner—Nicholas Whitelak
Attorney, Agent, or Firm—Armstrong, Nikaido, Marmelstein, Kubovcik & Murray

[57] ABSTRACT

A damper disc capable of maintaining a wide torsional angle by disposing two torsion springs in series within a hole of side plate is disclosed. The support plate disposed between two torsion springs is made of a sheet metal bent member, and is formed approximately in a V-shape opening wider outward in the radial direction, and the shape of the both spring receiving surfaces of the support plate is designed in a surface shape capable of abutting against the entire surface of the end surface of torsion spring, and the boss part is oscillatably coupled to the annular coupling plate by way of a pin at the inner side of the torsion spring in the radial direction.

3 Claims, 3 Drawing Sheets

DAMPER DISC

FIELD OF THE INVENTION

The present invention relates to a damper disc having two torsion springs disposed in series within an opening for disposing torsion springs.

BACKGROUND OF THE INVENTION

In this type of damper disc, two torsion springs are disposed in series in an opening in order to assure wide twisting ranges, and an intervening support plate is inserted between torsion springs in a manner free to move in the circumferential direction.

The present applicant developed and applied a structure, in such damper disc of spring series type, of coupling support plates 51 to annular coupling plates 52 with pins 53 as shown in FIG. 4, in order to prevent the support plates from thrusting out in the radial direction by centrifugal force (unopened Japanese Utility Model Applications 63-38836, 63-84777).

However, the support plates 51 are disposed in a plane vertical to the clutch axial center, and an intermediate member (float element) 55 made of resin is pinched by a pair of support plates 51 spaced in the axial direction, and the springs 18 are received by their ends in the rotating direction.

That is, the spring 18 is received by the end which has a very small contacting area, and the surface pressure rises, which required improvements from the viewpoint of durability. Still worse, since the spring 18 does not receive the entire end surface in the rotating direction, the spring 18 may get loose during operation and tend to be unstable. Besides, since the pin 53 for oscillatably supporting the support plate 51 is positioned at a point enclosed by front and rear springs 18, and the support plate 51 is positioned at right angle to the clutch axial center, the limit of the setting length of the spring 18 in the rotating direction becomes large, and the degree of freedom for setting the torsional characteristic is limited.

OBJECT OF THE INVENTION

It is hence a primary object of the invention to extend the degree of freedom of setting the torsional characteristic, keep a wide oscillating range for support plates to smooth the oscillation, and enhance the durability of support plates, by allowing to set the spring length longer, in a damper disc of spring series arrangement type for keeping a wide torsional angle.

DISCLOSURE OF THE INVENTION

Technical Means

In order to achieve the above object, the invention presents a damper disc composed by forming plural openings respectively in the output side plate and input side plates, disposing at least two torsion springs in series in each opening, coupling the side plates and output side plate by the torsion springs so as to transmit torque, and placing an intervening support plate between two series torsion springs so as to be movable in the rotating direction, wherein the support plate is formed approximately in a V-shape opening outward in the radial direction so as to have a pair of spring receiving surfaces vertical to the surface perpendicular to the clutch axial center line by a folding member made of metal plate, a boss part is integrally formed at the front end part of the inner circumferential side of the support plate, the shape of the spring receiving surfaces is designed in a surface shape capable of abutting against the entire end surface of the torsion spring, and each boss part is oscillatably coupled to an annular coupling plate at the inner side in the radial direction by torsion spring by means of pin.

Operation of the Invention

At the time of rotation, the input side plate is twisted against the output side plate, and the two torsion springs disposed in series within a same opening are compressed. At the same time, the support plate between the torsion springs moves in the rotating direction, but since each support plate is integrally coupled by the coupling plate, it would not thrust out in the radial direction due to centrifugal force.

Each support plate is oscillatably coupled to the coupling plate by way of a pin, and even if the spring load is imbalanced, the support plate oscillates about the pin accordingly so absorb the imbalance.

In addition, since the entire surface of the edge of the spring in the rotating direction is received by the support plate, the surface pressure does not hike, the durability is improved, and the spring itself is not loosened.

Moreover, since the spring receiving surface of the support plate is positioned in a position at right angle to the perpendicular surface to the clutch axial center, the spring storing space is kept wider, and the oscillating range of the support plate itself is extended.

DETAILED DESCRIPTION OF THE PREFERRED EMBODIMENT

Figure 1:
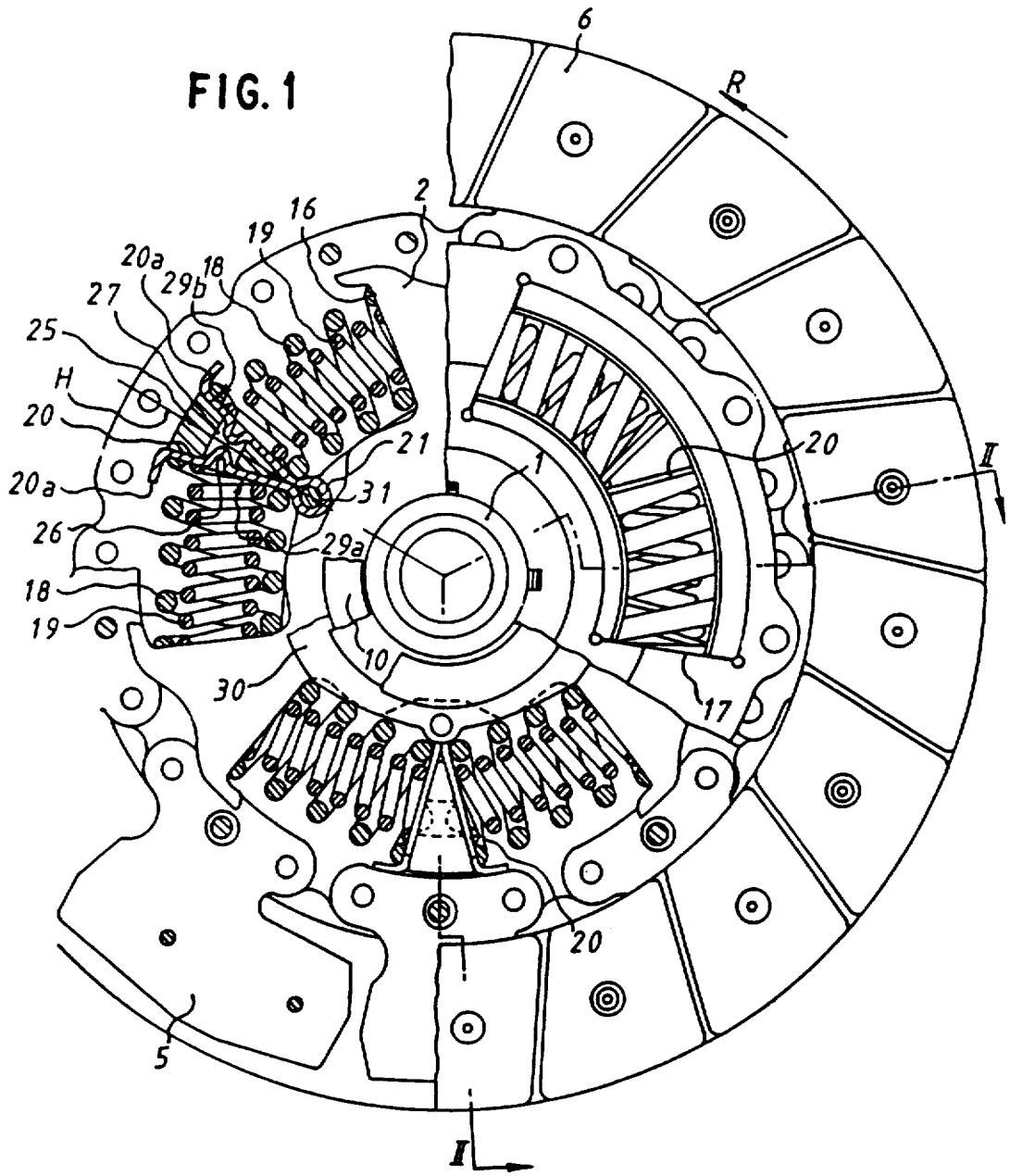
FIG. 1 is a partially cut-away side view of a damper disc according to the invention (a cut-away side section taken in the direction of arrow I in FIG. 2)
Figure 2:
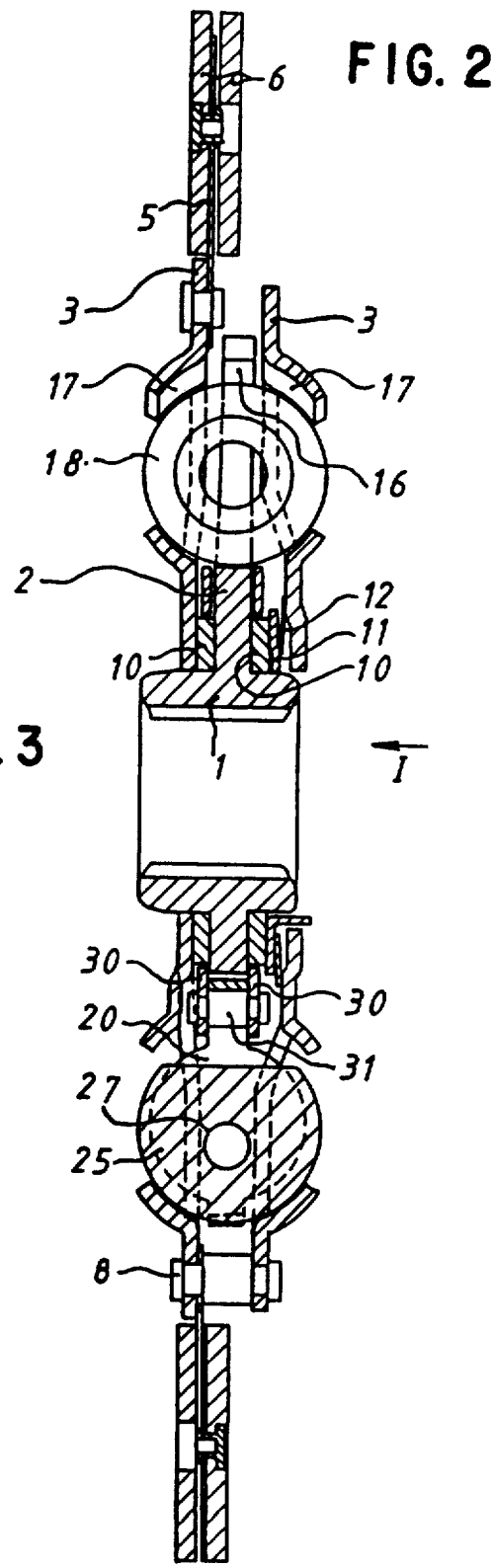
FIG. 2 is a sectional view of II—II of FIG. 1.

In FIG. 2 showing a vertical sectional view (section II in FIG. 1) of a damper disc according to the invention, an output side spline hub 1 is spline-fitted to an output shaft (not shown), and is integrally combined with a flange (output side plate) 2 extended outward in the radial direction. At both sides in the axial direction of the flange 2 are disposed a pair of input side plates 3, and these side plates 3 are joined end to end on the outer circumference by means of rivets 8. At an outer end of one side plate 3, plural cushioning plates 5 are affixed, and input facings 6 are affixed at both sides of the cushioning plates 5. The input facings 6 are held, for example, between flywheel and pressure plate, and are fed with rotating force.

Annular friction members 10 are disposed between opposite sides of the flange 2 and the inner side of each side plate 3, and a pressure plate 11 and a belleville spring 12 are disposed between one friction member 10 and side plate 3.

An opening 16 (a notch) for torsion spring 18 is formed in the flange 2, and an opening 17 for torsion spring 18 is formed in the side plate 3 correspondingly thereto. Torsion springs 18 are disposed in openings 16, 17 for compression in the rotating direction.

In FIG. 1, the opening 16 in the flange 2 is opened outward in the radial direction, and is formed in flange 2 in three positions at equal intervals in the rotating direction. Two torsion springs 18 are disposed in series in the circumferential direction in each opening 16. A support plate 20 is disposed between the front and rear torsion springs 18 in each opening 16. Torsion spring 18 is of a dual type, with a smaller spring 19 provided therein.

The opening 17 in the side plate 3 is also formed in three positions at equal intervals in the rotating direction, corresponding to the layout of the openings 16 in the flange 2.

Figure 3:
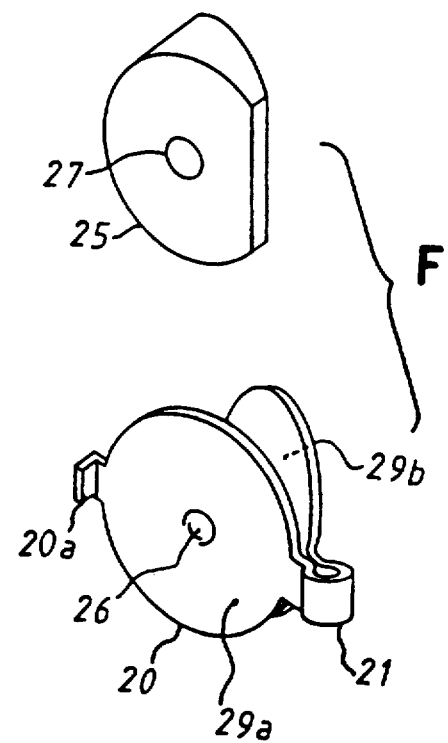
FIG. 3 is an exploded perspective view of a support plate.

The support plate 20, FIG. 3 is formed in a V-shape opening wider outward in the radial direction by folding and forming a sheet metal member, and a pin boss part 21 parallel to the center of output spline hub, is integrally formed at the shaft center end part of support plate 20.

The front and rear side surfaces 29a, 29b, in the rotating direction R, FIG. 1, of the support plate 20 are respectively spring receiving surfaces and are vertical to the plane perpendicular to the center of output spline hub 1. Spring receiving surfaces 29a, 29b are positioned mutually symmetrically to the plane H connecting the center of output spline hub 1 and the boss part 21. In the middle part of support plate 20, between spring receiving surfaces 29a, 29b, protrusions 26 projecting toward opposite surfaces 29a, 29b, and at the outer ends extending in radial directions, guide parts 20a are integrally formed so as to extend in opposite directions in the direction of rotation R in FIG. 1. Pin 31, FIGS. 1 and 2, extends through boss part 21 of support plate 20, connecting support plate 30 to annular coupling plates 30, at the opposite ends of pin 31, FIG. 2.

Figure 4:
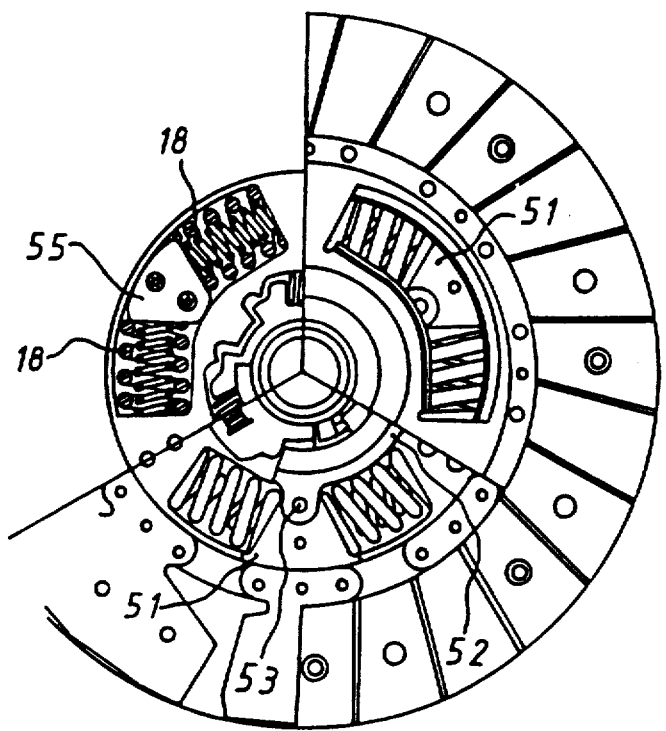
FIG. 4 a side view of a prior art.

Between the both spring receiving planes 29a, 29b of the support plate 20, a V-shaped intermediate member 25, FIG. 3 of a rigid resin, is supported. A hole 27, FIG. 1 penetrating in the rotating direction, is formed in intermediate member 25, and protrusion 26 of the support plate 20 penetrate into hole 27 so as to firmly hold intermediate member 25. The surface shape of the spring receiving planes 29a, 29b of the support plate 20 is formed to receive the entire end surface of spring 18 as shown in FIG. 1 and 4. The surface of intermediate member 25, in the rotating direction, is formed in a partial disc shape, being partially cut off in the inner end portion, FIG. 3.

The operation is described below. As the rotation torque increases, the side plate 3 is twisted to the rotating direction R side, for example, in FIG. 1 with respect to the flange 2, and the torsion spring 18 is compressed between the rotating direction rear end of the opening 17 in the side plate 3 and the rotating direction front end of the opening 16 of the flange 2. At this time, the friction member 10 is deflected to generate a hysteresis torque.

By the compression of the torsion spring 18, the support plate 20 in FIG. 1 also moves to the side of rotating direction R. In this case, the three support plates 20 are coupled by the annular coupling plate 30, and do not thrust out in the radial direction.

If the spring load of the torsion spring 18 is imbalanced, the support plate 20 oscillates around the pin 31 according to the imbalance to absorb the imbalance. Therefore, the compression action of the torsion spring 18 is stable, and a smooth twisting action is obtained.

EFFECTS OF THE INVENTION

As described herein, the invention presents a damper disc having two torsion springs 18 disposed in series with respect to mutually corresponding openings 16, 17, wherein:

(1) The pin 31 for supporting the support plate 20 is disposed inside of the torsion spring 18 in the radial direction, and is formed in approximately in a V-shape so as to provide a pair of spring receiving surfaces 29a, 29b vertical to the plane perpendicular to the clutch shaft center line by sheet metal bending member. Therefore, as compared with the support plate structure as shown in FIG. 4, the space for disposing the torsion springs can be kept wider, the setting length of the torsion spring 18 may be longer, and the degree of freedom of setting the torsional characteristic is increased.

(2) Since the spring receiving surfaces 29a, 29b of the support plate 20 are disposed at right angle to the plane perpendicular to the clutch shaft center and these surface shapes are designed to be in a shape capable of abutting against the entire end surface of the torsion spring 18, the surface pressure may be kept low, and the durability of support plate 20 is enhanced. Besides, at the time of compression, the position of the torsion spring 18 will not be unstable, and the compression performance is stabilized. Furthermore, since the pressure bearing surface is wide, the movement (sliding) in the rotating direction is smooth.

(3) Since each support plate 20 is coupled by the annular coupling plate 30, the support plate 20 is prevented from thrusting out in the radial direction by centrifugal force.

(4) Since the support plate 20 is oscillatably coupled through the pin 31, even if the spring load of the torsion spring 23 is imbalanced, the support plate 20 oscillates according to the imbalance, so that the compression action of the spring 18 is further stabilized.

INDUSTRIAL APPLICABILITY

The degree of freedom of setting the torsional characteristic is widened, and the compression action of spring is stabilized, so that it is ideal as a damper disc for an automotive clutch.

What is claimed is:

1. A damper disc having an output side plate and input side plates at opposite sides of said output side plate, a plurality of circumferentially extending spring openings in said output side plate and said input side plates, at least two torsion springs in series in each of said spring openings for coupling said input side plates and said output side plate for transmitting torque through said disc, an intervening support plate between said two torsion springs in series and movable in opposite rotating directions of said disc, said support plate being formed with an approximately V-shape opening extending radially of said damper disc and having a pair of spring receiving surfaces vertical to a surface perpendicular to the axial center line of said output side plates, said spring receiving surfaces being formed on a folded metal plate having a boss part integrally formed at the fold of said metal plate at the inner circumferential side of said support plate, said spring receiving surfaces abutting against the end surface of said torsion spring, said boss part being coupled to an annular coupling plate at the inner side of said support plate for movement in a radial direction by said torsion spring by a pin.

2. A damper disc as set forth in claim 1, wherein a V-shaped intermediate member made of a rigid resin is held behind said spring receiving surfaces of said support plate.

3. A damper disc as set forth in claim 1, wherein spring guide parts extending in opposite rotating directions of said disc are formed in the outer end part of said spring receiving surfaces.

* * * * *